March 28, 1967  R. P. BERGESON ET AL  3,311,237
FLUID EXTRACTOR SPEED CONTROL
Filed May 31, 1966  4 Sheets-Sheet 3
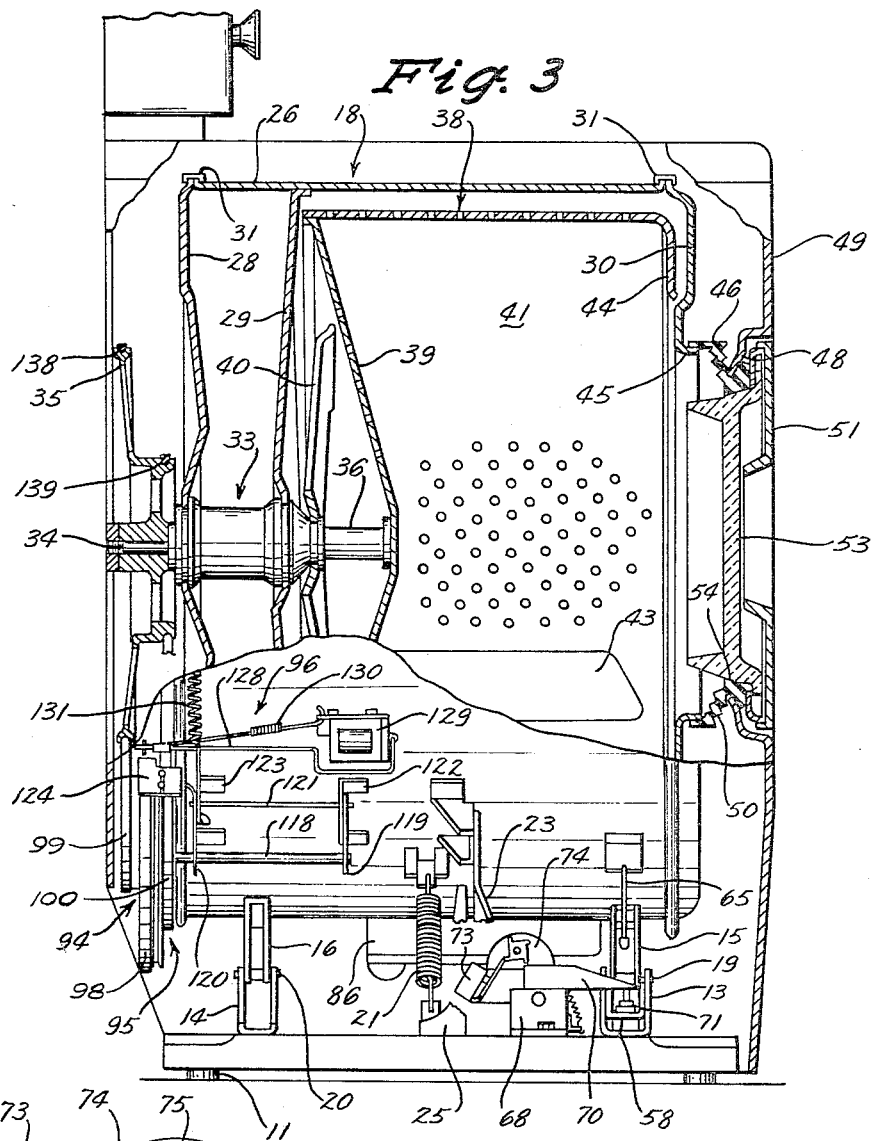
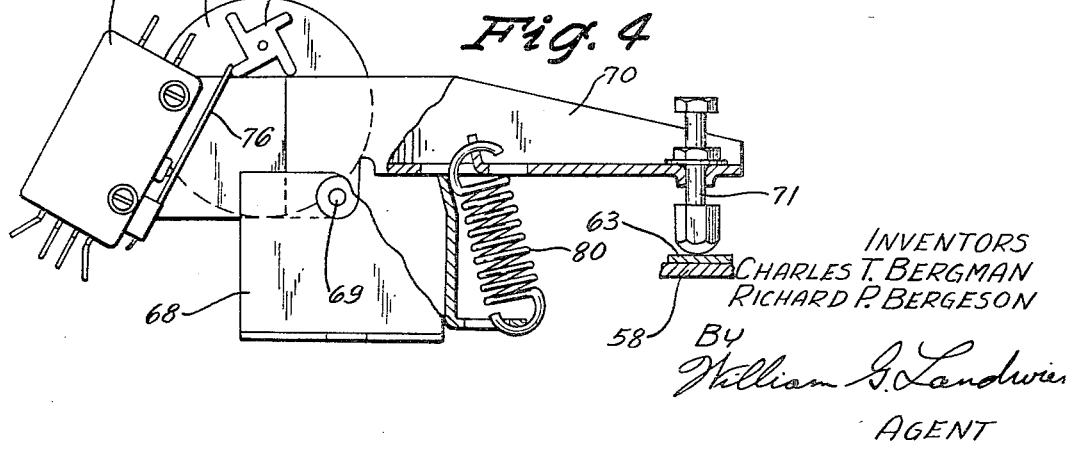
INVENTORS
CHARLES T. BERGMAN
RICHARD P. BERGESON
BY
William G. Landwier
AGENT

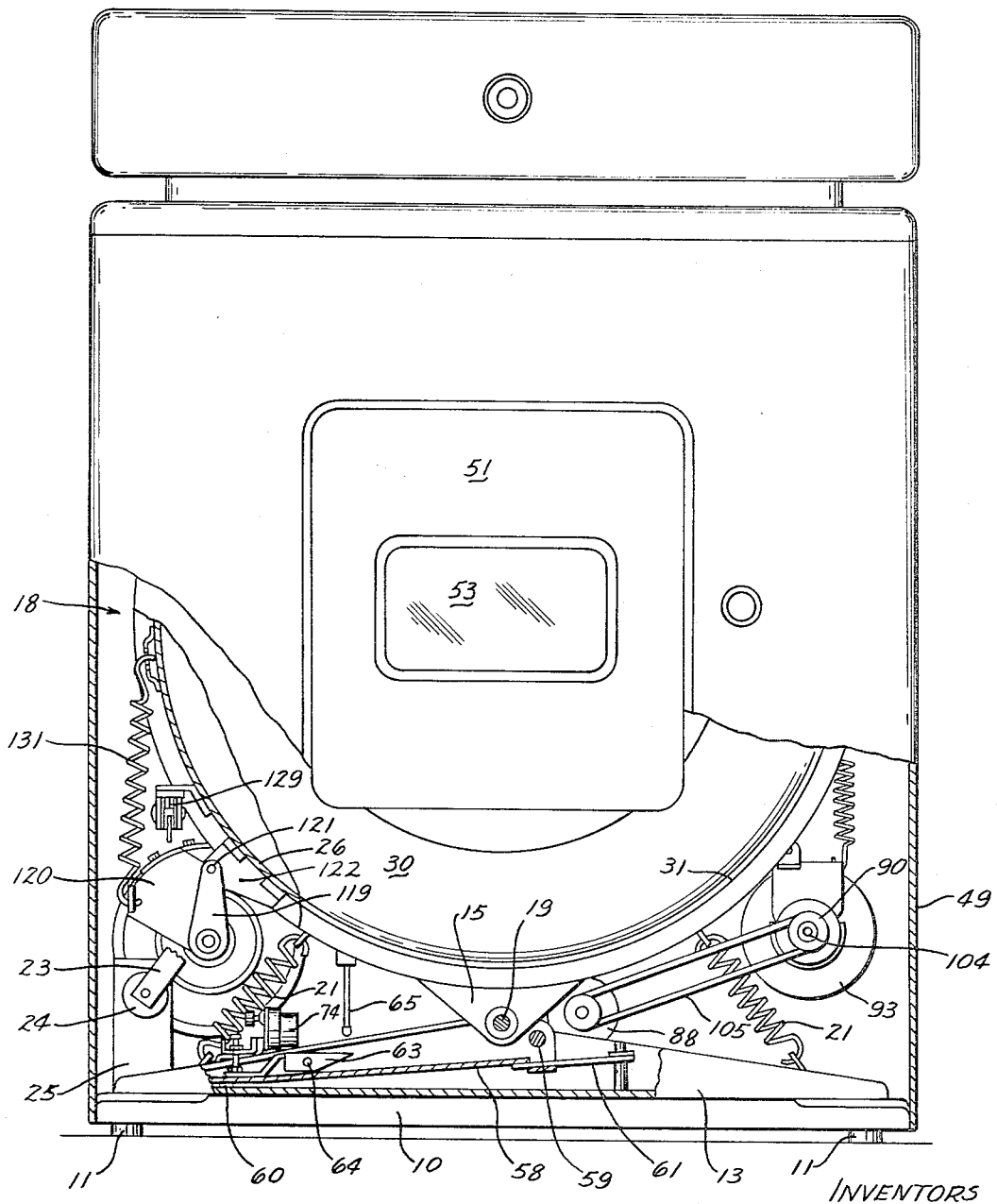

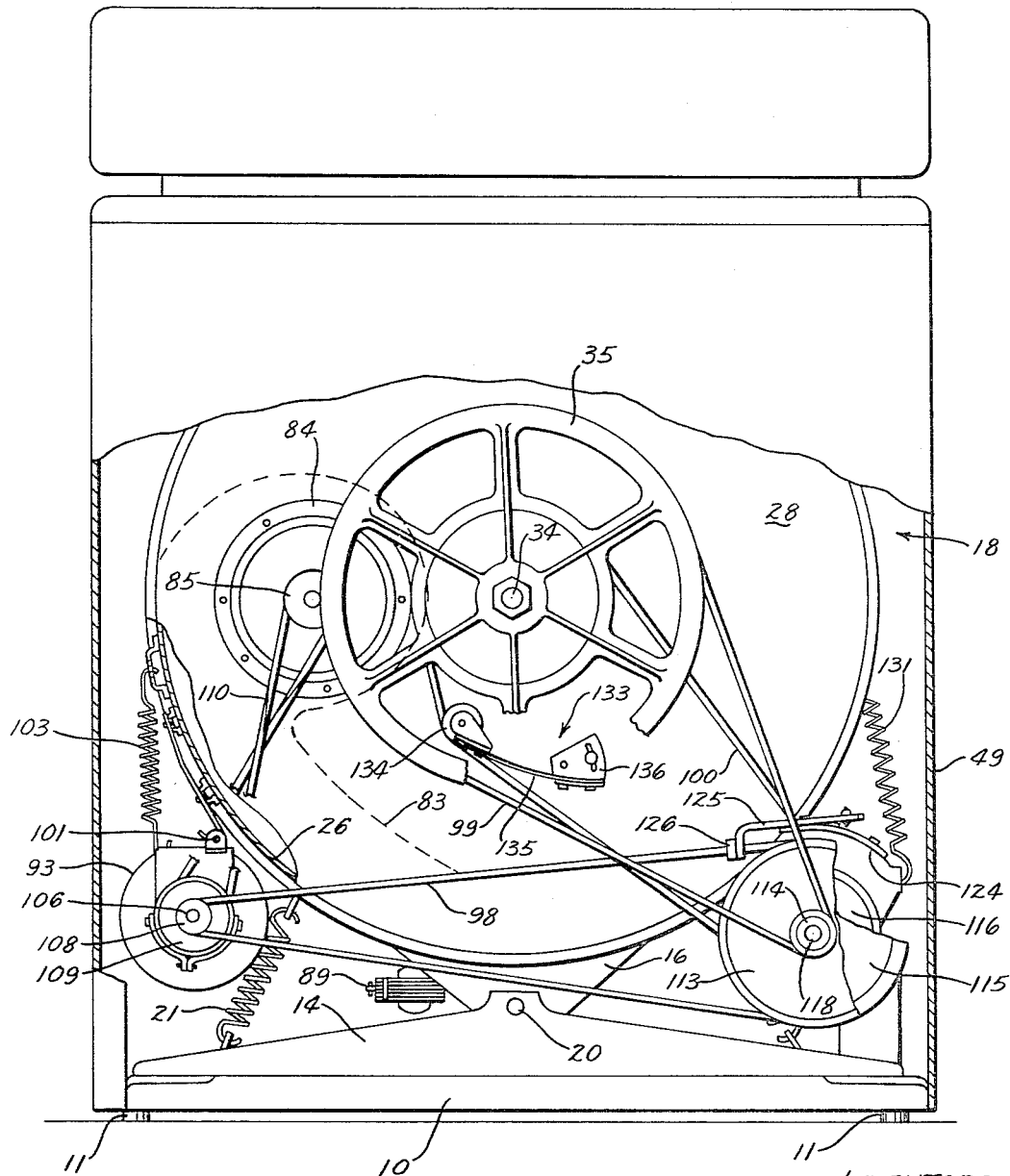

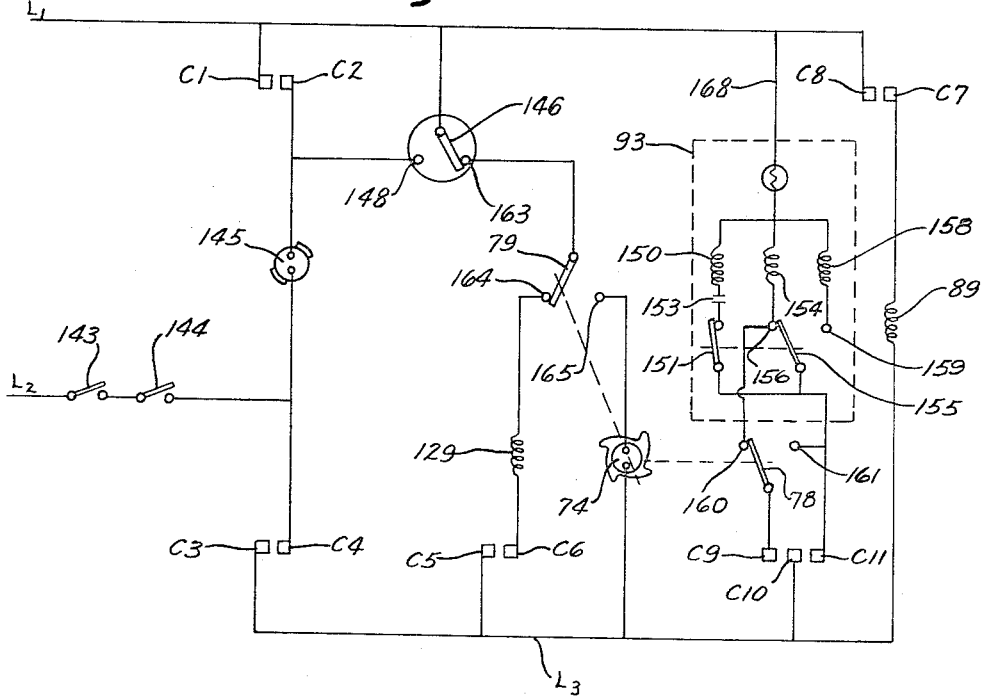

United States Patent Office 3,311,237
Patented Mar. 28, 1967

3,311,237
FLUID EXTRACTOR SPEED CONTROL
Richard P. Bergeson and Charles T. Bergman, Newton, Iowa, assignors to The Maytag Company, Newton, Iowa, a corporation of Delaware
Filed May 31, 1966, Ser. No. 554,034
7 Claims. (Cl. 210—144)

This invention relates to a control system for preventing excessive vibration of a fluid extraction apparatus and more particularly to a control system including a time delay mechanism and operable for controlling the rotational speed of a fluid extracting apparatus upon encountering unbalanced forces generated during high speed rotation of a fabric container having unbalanced, or acentric, clothes loads.

The problem of unbalanced loading is encountered in fluid extracting devices because of the tendency of the fabrics to become arranged in an uneven pattern around the inner periphery of the rotatable container as the container is accelerated toward extraction speeds. This unbalanced loading causes vibrations as the speed of the container increases. One type of previously known systems for controlling a fluid extractor upon encountering an excessive unbalance condition interrupts high speed operation and effects a fabric redistribution followed by reacceleration toward high speed extraction. This type of control system is embodied in U.S. Patent 3,084,799 issued to P. S. Decatur on Apr. 9, 1963, entitled, Time Delay Control Apparatus, and assigned to the assignee of the instant invention.

It is an object of the present invention to provide an improved control system operative, upon encountering an excessive unbalance condition, for interrupting the high speed operation to effect a period of fabric tumbling followed by a low extraction speed operation prior to reaccelerating the fabric container toward higher fluid extraction speeds.

It is a further object of this invention to achieve an improved control system for a fluid extracting apparatus having a two-speed motor and a two-speed transmission operable to provide a plurality of speeds and under control of means for sequentially effecting operation of said drive system at a tumbling speed subsequent to sensing an excessive unbalance condition followed by operation at a relatively low extraction speed and then at a high extraction speed after first and second time delays.

It is a further object of this invention to provide a system for controlling the speed of a fluid extractor upon encountering an excessive unbalance condition wherein the control system includes switch means responsive to vibration sensing means for returning the speed of the fabric container to a tumble speed and operative after first and second time delays for returning the speed of the fabric container to a relatively low extraction speed and then toward a higher extraction speed.

The present invention achieves the above objects in a combination washer-drier apparatus operable at a plurality of speeds including tumble, low extraction, intermediate extraction, and high extraction speeds. Sensing means, responsive to a predetermined unbalanced loading of the fabric container, is operable for actuating switch means to return the driving means from the extraction speed at which the unbalance is sensed to a tumbling speed for redistributing the fabrics. The switch means is responsive to a time delay means for returning the drive means to the low extraction speed and then toward a higher extraction speed after first and second time delay periods.

Operation of the device and further objects and advantages thereof will become evident as the description proceeds and from an examination of the accompanying drawings which illustrate a preferred embodiment of the invention and in which similar numerals refer to similar parts throughout the several views, wherein:

FIGURE 1 is a front view of a combination washer-drier having a lower portion of the cabinet removed to expose, among other components, the tub supporting means, and a portion of the unbalance control system;

FIGURE 2 is a rear view of the combination washer-drier of FIGURE 1 with a portion of the cabinet back removed for showing the drive system of the present invention;

FIGURE 3 is a side view showing a portion of the drive system of the present invention and further including a fragmentary sectional view showing the drum and hub structure of the combination washer-drier;

FIGURE 4 is an enlarged view of a portion of the unbalance control system;

FIGURE 5 is an electrical schematic diagram showing the control circuit for the combination washer-drier embodying the present invention; and FIGURE 6 is a chart showing the programmed operation of the sequentially operable switches included in FIGURE 5.

Referring now to the accompanying drawings in detail, it will be seen that the combination washer-drier apparatus includes a base frame 10 mounted on a plurality of legs 11. Mounted upon the base frame 10 is a pair of support members 13, 14 which are welded, or securely affixed in some suitable manner, to the base frame 10 to form the major support for the washer-drier unit. The support members 13, 14 have a channel cross section and are substantially triangular in elevational configuration. A pair of brackets 15, 16, positioned above the support members 13, 14, are attached to the tub or casing, generally indicated by the arrow 18. These tub-mounted brackets 15, 16 are pivotally mounted on the support members 13, 14 by a pair of pivot pins 19, 20 so that the tub 18 may oscillate in an arcuate movement about the pivot pins 19, 20 in response to various forces generated within the tub 18.

The tub 18 is normally maintained in an upright position by a pair of centering springs 21, each of which is connected between the base 10, and the tub 18. A damper leaf spring 23, shown partially in FIGURES 1 and 3, depends from the tub 18 and carries a damper pad 24 in a ball and socket joint at the lower end thereof. The base frame 10 is provided with an upstanding damper plate 25 frictionally engaged by the damper pad 24. The energy imparted to the tub 18 causes the tub 18 to oscillate about the pivot pins 19, 20 so that energy is absorbed and dissipated by the relatively-movable, frictionally-engaged, damper pad 24 and damper plate 25.

The tub includes a generally cylindrical sidewall 26, and as best shown in FIGURE 3, a pair of spaced rear walls 28 and 29, and a front wall 30. The front and outer rear walls 30 and 28 are connected to the cylindrical sidewall 26 by means of the encompassing flanged hoop-like clamp members 31 while the partition wall 29 is secured, as by welding, to the sidewall 26.

It will be seen from an inspection of FIGURE 3 that the spaced rear walls 28 and 29 support a tub bearing assembly, indicated generally by the reference arrow 33. The bearing assembly 33 produces a rigid support with respect to the tub 18 for a pair of bearings within the bearing assembly 33 for supporting the main drive shaft 34.

The rear end of the main drive shaft 34 is rigidly connected to the large drive pulley 35 whereas its front end is threaded into the hub 36 of the fabric container 38. The fabric container 38 includes a perforate rear wall 39 rigidly affixed to and cooperating with a spider-like support member 40 to form a double cone support connected to the hub 36 for providing a rigid support for the fabric container 38 on the main drive shaft 34. As apparent from FIGURE 3, the fabric container 38 also includes a perforate cylindrical sidewall 41 carrying clothes elevating vanes 43. The sidewall 41 merges into the short front wall 44 and joins the flanged rear wall 39 in an overlapping relationship.

The front wall 30 of the tub 18 also includes a circular loading opening 45 encircled by one end of a bellows seal 46. This seal 46 has its opposite end fastened to a similar opening 48 formed in the cabinet 49. The seal 46 includes a number of convolutions 50 permitting movement of the tub 18 relative to the cabinet 49. A rectangular door 51 hinged on the cabinet 49 carries a transparent glass window 53 having a cylindrical portion depending rearwardly through the bellows seal 46 for peripheral engagement with a flexible annular sealing lip 54.

A system for detecting vibrations of the tub 18 and for controlling the rotative speed of the container 38 upon sensing vibrations will now be described. Referring again to the mounting system, it is to be noted that the rear channel member 14 actually receives and directly supports the rear pivot pin 20; however, the same is not true as to the connection between the front channel 13 and the front pivot pin 19. As previously indicated, the front end of the tub is supported on the front tub bracket 15. This bracket 15 is pivotally mounted on the front pivot pin 19. The front pivot pin 19 extends through clearance holes in the legs of the front channel member 13 but the pin 19 is supported by a lever arm 58 nested within the front channel 13. The lever arm 58 is in turn supported on a mounting pin 59 penetrating and supported by the upwardly extending legs of the front channel member 13. The front pivot pin 19 is actually suspended in a floating pivot in the front channel member 13 and, in practice, has a clearance of approximately $\frac{1}{16}''$ from the closest point of channel 13.

Three forces acting on the lever arm 58 establish a condition of equilibrium about the mounting pin 59 in order to produce the described floating pivot about the front pivot pin 19. The first of these is a clockwise force about the mounting pin 59 and is applied upwardly through a supporting foot 60 located at the left end of the lever arm 58 as viewed in FIGURE 1. The weight of the tub 18 and the parts supported by that tub provide a second counterclockwise force applied directly to the lever arm 58 through the pivot pin 19. The third force, a balancing force, acts upon lever arm 58 and is exerted by a leaf spring 61 inserted into an opening of the lever arm 58 so as to form an extension of the latter member. Adjusting means is attached between the base frame and the end of the leaf spring and provides means for varying the force exerted downwardly on the leaf spring 61. It may be seen that movement of the front pivot pin 19, caused by substantially vertical movement of the front of the tub 18, pivots the lever arm 58 about the mounting pin 59.

The lever arm 58 carries an actuator 63 on a pin 64 with the actuator 63 positioned so as to be responsive to engagement at one end by a plunger 65 depending from a lower portion of the tub 18. It is therefore seen that arcuate movement of the tub 18 about its supporting pins 19, 20 will cause the plunger 65 to engage the actuator 63 and move it in a clockwise direction about the pin 64. Likewise, an upward movement of the left end of the lever member 58, as viewed in FIGURE 1, will lift the actuator 63 upwardly.

Referring now to FIGURES 3 and 4, a mounting bracket 68 is shown attached to the base frame 10 for supporting, at a pivot point 69, a movable lever 70 carrying a depending plunger 71 at one end thereof and switch means 73 at the other end thereof. Also supported by the stationary bracket is an auxiliary timing motor 74 which drives a star wheel cam 75 engageable with the operating lever 76 of switch 73.

Upon movement of the actuator 63, either pivotally or upwardly with the lever member 58, as previously explained, the plunger 71 is moved upwardly to pivot the movable lever 70 in a counterclockwise direction about the pivot point 69 and to move the switch operating lever 76 downwardly away from the star wheel 75 so as to allow the switch operating lever 76 to move to a released position. The switch means 73 includes a pair of single-pole double-throw switch members 78 and 79, shown in the circuit of FIGURE 5, and is operable for energizing at least one circuit portion as will be described hereinafter. The auxiliary timing motor 74 is energized upon operation of the switch means 73 and remains energized until decreased tub movement allows the spring 80 to retain the movable lever 70 in its normal position and until the star wheel 75 is driven to the position at which it again moves the switch operating lever 76 to the actuated position. From the above description, it will be understood that whenever an excessive unbalance load condition exists within the tub 18, the unbalance sensing mechanism will be actuated by either an arcuate movement of the tub 18 or by a small, substantially vertical movement of the front end of the tub 18 to effect a change in the condition of energization of the washer-drier unit as will be more fully described hereinafter.

More specific details of construction of this unbalance control system may be found in United States Patent 3,084,799 issued to P. S. Decatur on Apr. 9, 1963 and assigned to the assignee of the instant invention.

A combination blower condenser unit capable of moving air through the tub 18, scrubbing lint from this air, and condensing moisture from hot vapors formed within the tub during the drying operation, is positioned within the compartment formed by and between portions of the spaced rear walls 28 and 29. The compartment for the blower condenser unit is produced by cooperation of the rear walls 28 and 29 with an imperforate scroll-shaped sidewall 83, shown by dotted lines in FIGURE 2, and bridging the space between the rear walls 28 and 29. Water for the condensing operation is directed onto the impeller (not shown) positioned behind a removable plate 84 and driven by a blower pulley 85.

Provision is made in the instant washer and drier combination for supplying water for the washing operation and for accumulating washing fluids in a lower recessed sump portion 86 of the tub 18. The sump 86 receives the washing fluid from the tub 18 and also receives from the blower condenser compartment the condensing fluid and the condensate and lint removed from the air entering the blower condenser unit. Fluids and lint entering the sump 86 are discharged through a pump 88 to an external drain. A valve (not shown), controlled by a solenoid 89, is positioned between the pump 88 and the external drain to control the periods of time fluids are discharged to the external drain. The pump 88 is driven during washing operations through a motor pulley 90; however, the solenoid 89 is de-energized during the washing operation to maintain the valve closed and the fluid within the tub 18.

Though not shown, heating means are provided within this combination washer-drier and are capable of radiating heat energy into and through the tub for effecting a drying operation of the fabrics following the washing operation.

More specific details of construction of this blower condenser unit, the aforementioned bearing assembly, the fluid inlet and draining system, and the heating means may be found in United States Patent 2,986,917 issued to T. R. Smith on June 6, 1961, and assigned to the assignee of the instant invention.

Power to rotate the fabric container 38 is supplied by a drive system including a two-speed motor 93, a pair of alternate speed reduction pulley assemblies indicated generally by the arrows 94 and 95, belt shifting means 96, and power transmission means including a plurality of belts 98, 99, and 100. As will be explained more fully hereinafter, this drive system is operable for providing a plurality of speeds of rotation of the fabric container 38 so as to achieve an optimum fabric treatment cycle. Specifically, this drive system is operable for providing a relatively slow tumble speed for accomplishing the washing extraction, a low extraction speed, below the critical speed of the unit, for effecting arrangement and plastering of the fabrics around the inner periphery of the container and removing a portion of the retained fluids from the fabrics, an intermediate extraction speed for removing a larger portion of the retained fluid from the fabrics, and a relatively high speed spin for accomplishing the primary centrifugal fluid extraction.

The two-speed motor 93 is operable at 1725 and 1150 r.p.m. The motor 93 is adjustably and pivotally supported from the wall 26 of the tub 18 and biased in a clockwise direction around the pivot 101 by the adjustable spring 103. A shaft extension 104 from one end of the motor 93, supports the pulley 90 drivingly coupled to a round stretch belt 105 for driving the drain pump 88 as viewed in FIGURE 1. A shaft 106 extending from the opposite end of the motor 93, as viewed in FIGURE 2, carries a pair of pulleys 108 and 109 fixedly mounted thereon. The smaller pulley 108 of the pair drives the primary drive belt 98, in turn connected to one of the pair of speed reduction pulley assemblies 94 or 95. The larger motor driven pulley 109 is drivingly engaged by the blower pulley belt 110.

As best seen in FIGURES 2 and 3, the speed reduction pulley assemblies 94 and 95 are connected to the drive motor 93 through the small motor-driven pulley 108 and the primary drive belt 98. The first pulley assembly 94 comprises a large pulley 113 and an attached small pulley 114 and may be considered as the tumble pulley assembly 94. The spin pulley assembly 95, located closest to the tub 18, includes a large pulley 115 and an attached small pulley 116. The tumble pulley assembly 94 and the spin pulley assembly 95 are adjacently mounted on a common jackshaft 118 for relative rotation to each other.

The two large pulley members 113 and 115 are of substantially equal diameter and are closely spaced to facilitate shifting of the primary drive belt 98 between the drive grooves of the two pulleys.

The jackshaft 118 is carried by a pair of supporting arms 119 and 120 that are in turn pivotally mounted on a pivot pin 121 supported at its extreme ends by a pair of brackets 122 and 123 fixed to the exterior sidewall 26 of the tub 18.

The rear supporting arm 120 supports a flange bracket 124 for pivotally mounting a belt shifting lever 125 having a pair of legs 126 depending therefrom at one end astride the primary drive belt 98. A linkage 128 is pivotally and adjustably connected to the other end of the belt shifting lever 125 and is controlled by a selectively energizable solenoid 129 for operating the shifting lever 125 to move the primary drive belt 98 between the pair of large drive pulleys 113 and 115. The solenoid 129 is securely mounted on the exterior wall 26 of the hub 18 and, upon energization thereof, the lever 125 moves the primary drive belt 98 from the large tumble pulley 113 to the large spin pulley 115. A tension spring member 130 biases the belt shifting lever 125 for moving the primary drive belt 98 from the large spin pulley 115 to the large tumble pulley 113 upon de-energization of the solenoid 129.

The jackshaft 118 is biased in a counterclockwise direction about the pivot pin 121 by spring 131, as best seen in FIGURE 1, to effect proper tensioning of the second-stage tumble belt 99. The second-stage spin belt 100 is tensioned by an idler assembly 133 comprising an idler pulley 134 biased by a leaf spring 135 attached between the idler pulley 134 and a bracket 136 adjustably mounted on the back wall 28 of the tub 18. This system of belt tensioning provides for proper belt tensions and acceleration rates during increasing speeds and provides, with proper location of the pivot pin 121, for effective control of deceleration of avoid severe torque reaction upon de-energization of the driving means.

The main drive pulley 35 includes a first V-groove 138 for receiving the second-stage tumble belt 99 from the small tumble pulley 114 and, at a smaller diameter, includes a second V-groove 139 for receiving the second-stage spin belt 100 from the small spin pulley 116.

It is therefore seen that a pair of alternate drive paths are established between the motor 93 and the container 38. The first path is from the motor 93 through the primary drive belt 98 to the large tumble pulley 113, and through the small tumble pulley 114 and the second-stage tumble belt 99 to the large diameter groove 138 of the main drive pulley 35. This drive path provides a relatively high-ratio speed reduction operable with the motor running at 1150 r.p.m. for driving the container at a fabric tumbling speed of 50 r.p.m. and operable with the motor running at 1725 r.p.m. for driving the container at a low extraction speed of 75 r.p.m.

The second drive path is established from the motor 93 through the primary drive belt 98 to the large spin pulley 115, and through the small spin pulley 116 and the second-stage spin belt 100 to the small diameter groove 139 of the main drive pulley 35. This drive path provides a relatively low-ratio speed reduction and is operable with the motor running at 1150 r.p.m. for driving the container at an intermediate extraction speed of 200 r.p.m. and operable with the motor running at 1725 r.p.m. for driving the container at a relatively high extraction speed of 300 r.p.m.

Referring now to FIGURE 5, an electrical circuit diagram shows schematically the components and circuitry included in the preferred embodiment of the instant invention.

The electrical circuit, connected between lines $L_1$ and $L_2$, may be completely de-energized upon opening either the start switch 143 or door-operated switch 144 under control of the operator. The combination washer-drier unit is controlled by a sequence control mechanism which is shown partially, and schematically, in the electrical circuit of FIGURE 5. The sequence control mechanism is of a conventional construction and includes a plurality of switches, represented by the contacts C1 through C11 which operate in pairs as shown in FIGURE 5. Operating means in the form of cams close each of these pairs of contacts in a predetermined sequence. Referring to FIGURE 6, there is shown a sequence chart for the above referenced contact pairs where the shaded areas indicate portions of the cycle during which specific contact pairs are closed. In this embodiment, an increment of timer advance represents a time period of one minute.

The advancement of the cams and thus the operation of the contact pairs are under control of a timing motor 145 operable for advancing the series of cams at a slow timing speed. Energization of the timing motor 145 is through a pair of contacts C1, C2 or through a pressure switch 146 operative to a contact 148 responsive to a predetermined level of the fluid within the washing container 38.

The drive system, as previously indicated, includes a two-speed motor 93 and a solenoid 129 for shifting the primary drive belt 98. The drive motor 93 is connected between lines $L_1$ and $L_3$, with line $L_3$ being connected to line $L_2$ through the timer contact pair C3, C4 and through the start switch 143 and door switch 144. The motor 93 includes the start windings 150 in series with a centrifugal switch 151 and a capacitor 153. A second portion of the motor circuit includes a four-pole run winding 154 and a centrifugally operated winding selection switch 155 made to contact 156. A third portion of the motor circuit includes a six-pole run winding 158 connectable with the winding selection switch 155 at normally open contact 159. The centrifugal switch 151 is operable to an open position at a predetermined switching speed of the motor 93 and is linked to the winding selection switch 155 so as to operate the switch 155 from connection with the four-pole winding 154 to connection with the six-pole winding 158 at the predetermined switching.

The main drive motor 93 is under control of the tumble switch 78 having a first contact 160 connected to the four-pole winding 154 at contact 156 and a second contact 161 connected to the centrifugal switch 151 and winding selection switch 155. The tumble switch 78 is in turn connected to contact C9. Contact C11 is connected to the six-pole winding 158 through winding selection switch 155 made to contact 159 for selectively bypassing the tumble switch 78. Contact C10, selectively engageable with contact C9 or C11, is connected to line L$_3$. The tumble switch 78 is operated for completing a circuit through the first contact 160 when the switch operating lever 76 is in the actuated position as shown in FIGURE 4.

The belt shifting solenoid 129 is connected between lines L$_1$ and L$_3$ by a circuit which includes the pressure switch 146 made to a second contact 163 at a predetermined lower fluid level, through a switch designated as the spin control switch 79 made to a first contact 164 and through timer contact pair C5, C6. The spin control switch 79 is controlled by the auxiliary timing means 74 and is closed to the first contact 164 when the switch operating lever 76 is in the actuated position as shown in FIGURE 4.

The auxiliary timing motor 74 may be energized by a circuit through the pressure switch 146 made to the second contact 163 and through the spin switch 79 made to the second contact 165 upon operation of the unbalance sensing means as previously indicated. The speed of the auxiliary timing motor 74 is one-half r.p.m. in the preferred embodiment for providing a 30-second time delay between each of the lobes of the star wheel 75.

The drain solenoid 89, controlling the period of time during which fluid is drained from the tub, is connected between lines lines L$_1$ and L$_3$ in series with a contact pair C7, C8.

The electrical circuit as shown in FIGURE 5 and controlled by the timer cams with a program as indicated in FIGURE 6, is operable for controlling the washer-drier apparatus through a series of operations comprising the major divisions of wash, rinse, spin dry, and tumble dry. The instant invention is specifically directed to unbalance control during the spin dry or extraction portions. A consideration of the circuit of FIGURE 5 taken in conjunction with the program control of FIGURE 6 will show that the particular portions of the cycle to which the instant invention is directed include the following:

| Increment | Operation Performed | Container Speed (r.p.m.) |
|---|---|---|
| 21 | Low speed extraction | 75 |
| 22 | High speed extraction | 300 |
| 26 | Low speed extraction | 75 |
| 27 | High speed extraction | 300 |
| 33 | Low speed extraction | 75 |
| 34 | Intermediate speed extraction | 200 |
| 35 | Pause | 0 |
| 36 | Tumble | 50 |
| 37 | Low speed extraction | 75 |
| 38–40 | High speed extraction | 300 |
| 41 | Tumble | 50 |
| 42 | Low speed extraction | 75 |
| 43–46 | High speed extraction | 300 |
| 47 | Pause | 0 |

It is believed that one skilled in the art is able to understand the details of the electrical circuit of FIGURE 5 when considered in view of the above listed portions of the cycle of operation and in view of the switching as shown in FIGURE 6. However, certain of the operations, more closely related to the instant invention will be explained in detail hereinafter.

Following selection of the desired cycle of operations by the operator and the closing of the door 51 and the closing of the start switch 143, the timing motor is energized first through the pressure switch 146 and then through contacts C1, C2 for advancing the sequence control mechanism through the washing portion of the cycle of operation and into the first fluid extraction operation such as beginning in increment 21. During this increment, contacts C7, C8 are closed for energizing the drain solenoid 89 to effect draining of the fluid from the tub 18. Contact C10 is closed to contact C9 for energizing the motor 93 through the four-pole winding 154 for operation at 1725 r.p.m. and through the tumble switch for effecting rotation of the container 38 at 75 r.p.m. The motor 93 is energized by a circuit from power line L$_1$ through the connecting line 168, the four-pole run winding 154, the tumble switch 78 made to contact 160, and through contact C9, C10 to the line L$_3$. As the timer is advanced one increment, contact C5 is closed to contact C6 for energizing the belt shifting solenoid 129. The energizing circuit between power line L$_1$ and L$_3$ includes the pressure switch 146 made to contact 163, the spin switch 79 made to contact 164, and closed timer contacts C5, C6. Energization of the solenoid 129 effects shifting of the belt 98 from the large tumble pulley 113 to the large spin pulley 115 and acceleration of the container to 300 r.p.m.

During the fluid extraction periods, the machine is subject to excessive vibration because of unbalanced loading of materials within the rotating container 38. The unbalance control system is operative during these periods for effecting a decrease in speed upon sensing a predetermined unbalance of forces generated within the container. If such an unbalance is present, the movable lever 70, as seen in FIGURE 4. is pivoted about the pivot point 69 for moving the switch operating lever 76 away from the star wheel 75 and thus effecting operation of the switch means 73. This operation of the switch means 73 moves the spin switch 79 from contact 164 to contact 165 and moves the tumble switch 78 from contact 160 to contact 161 at substantially the same time. This actuation effects deenergization of the shifting solenoid 129 and energization of the auxiliary timing motor 74 while also effecting the decrease in motor speed from 1725 r.p.m. to 1150 r.p.m. The net result is that the rotational speed of the container 38 decreases from the speed at which an unbalance is sensed to a tumble speed of approximately 50 r.p.m. The motor 93 is energized for rotation of the container 38 at 50 r.p.m. by a circuit from L$_1$ to L$_3$ as follows: through line 168, six-pole windings 158, winding selection switch 155 made to contact 159, tumble switch made to contact 161 and through timer contacts C9, C10. Rotation of the star wheel 75 effects reactuation of the switch means 73 so as to sequentially operate first the tumble switch 78 from contact 161 to contact 160 after an approximate 22.5 second time delay to effect an increase in speed from 50 r.p.m. to 75 r.p.m. and then to operate the spin switch 79 from contact 165 to contact 164 after a second time delay of approximately 7.5 seconds to effect de-energization of the auxiliary timing motor 74 and to effect energization of the belt shifting solenoid 128 so as to increase speed from 75 r.p.m. toward a higher extraction speed. The redistribution effected during the tumbling operation and the removal of previously retained fluids assist in effecting a higher speed of extraction than that at which the first unbalance was sensed. This unbalance control is also operative as previously indicated during the final fluid extraction portion which specifically includes increments 33, 34, 37, 38–40, 42, and 43–46.

If an excessive unbalance condition is encountered in increments 21, 26, 33, 37 or 42 during which the drive means is energized for the 75 r.p.m. operation, the control system will effect a timed period of tumble operation followed only by a return to the 75 r.p.m. Since contacts C5, C6 are open, the belt shifting solenoid will not be energized after the second time delay period.

Thus it may be seen that this improved unbalance control system provides a series of sequential operations following the sensing of an excessive unbalance condition that insure an immediate decrease in speed to prevent harmful vibrations, followed by a low speed rotation for tumbling and mixing the fabrics, and followed in turn by an operation at a relatively low extraction speed for arranging and holding fabrics against the inner periphery of the container prior to reaccelerating the fabric container toward the fluid extraction speeds. Positive timing means are used to insure operation of each step through a predetermined time period.

In the drawings and specification, there has been set forth a preferred embodiment of the invention and, although specific terms are employed, these are used in a generic and descriptive sense only, and not for purposes of limitation. Changes in form and the proportion of parts, as well as the substitution of equivalents are contemplated, as circumstances may suggest or render expedient without departing from the spirit or scope of this invention as further defined in the following claims.

We claim:

1. In a laundry apparatus operable through an extraction operation for centrifuging fluid from fabrics, the combination comprising: a support; a casing movably mounted on said support; a fabric container revolubly mounted within said casing on a non-vertical axis and adapted to receive said fabrics; drive means for rotating said container at a plurality of speeds including a tumble speed for tumbling said fabrics, a low extraction speed for arranging and holding the fabrics against the inner periphery of said container, and a relatively high speed for effecting centrifugal fluid extraction; means for controlling said drive means to selectively effect acceleration of said container toward said high speed rotation; sensing means actuatable responsive to predetermined unbalanced forces within said container during either said extraction speeds for operating said controlling means to return said container to said tumble speed; and time delay means responsive to actuation of said sensing means for operating said controlling means to interrupt operation of said container at said tumble speed and to initiate operation at said low extraction speed after a first predetermined time delay following actuation of said sensing means and then to operate said controlling means to interrupt operation of said low extraction speed and to initiate operation at said high speed after a second succeeding predetermined time delay.

2. In a laundry apparatus for centrifuging fluids from fabrics as defined in claim 1 wherein said drive means includes a motor operable at a first speed and a second higher speed and further includes a power transmission operable at a high-ratio speed reduction and a low-ratio speed reduction and wherein said controlling means includes first circuit means for establishing the speed of said motor and second circuit means for establishing the speed reduction ratio of said power transmission unit.

3. In a laundry apparatus for centrifuging fluids from fabrics as defined in claim 1 wherein said drive means includes a motor operable at a first speed and a second higher speed and further includes a power transmission operable at a high-ratio speed reduction and a low-ratio speed reduction and wherein said controlling means includes switch means responsive to actuation of said sensing means for effecting operation of said motor at said first speed and said transmission at said high-ratio speed reduction and then responsive to said time delay means for effecting said low extraction speed by energizing said motor at said high speed after said first time delay and then effecting said high speed by shifting said transmission to said low-ratio speed reduction after said second time delay.

4. In a laundry apparatus for centrifuging fluid from fabrics as defined in claim 1 wherein said controlling means includes a pair of switches operable substantially simultaneously by said sensing means for returning said container to said tumble speed and wherein said pair of switches is operated sequentially by said time delay means after said first and second time delays, respectively, for initiating operation of said container at said low extraction speed and then at said high speed.

5. In a laundry apparatus for centrifuging fluid from fabrics as defined in claim 1 wherein said drive means includes a motor operable at a first speed and a second higher speed and further includes a power transmission operable at a high-ratio speed reduction and a low-ratio speed reduction and wherein said controlling means includes switch means operable from a first condition to a second condition responsive to actuation of said sensing means for effecting operation of said motor at said first lower speed and operation of said power transmission to said high-ratio speed reduction whereby said container is rotated at said tumble speed and further operable by said time delay means to a third intermediate position after said first time delay for effecting operation of said motor at said second higher speed while maintaining said power transmission means in said high-ratio speed reduction through said second time delay whereby said container is rotated at said low extraction speed and then said high speed.

6. In a laundry apparatus operable through an extraction operation for centrifuging fluid from fabrics, the combination comprising: a support; a casing movably mounted on said support; a fabric container revolubly mounted within said casing on a non-vertical axis and adapted to receive said fabrics; drive means for rotating said container at a plurality of speeds including a tumble speed for tumbling said fabrics, a low extraction speed for arranging and holding the fabrics against the inner periphery of said container, and a relatively high speed for effecting centrifugal fluid extraction, said drive means including a motor operable at a first speed and a second higher speed and further including a power transmission operable at a high-ratio speed reduction and a low-ratio speed reduction; means for controlling said drive means to selectively effect rotation of said container at one of said plurality of speeds and including first circuit means for establishing the speed of said motor and further including second circuit means for establishing the speed reduction ratio of said power transmission means, said controlling means further including sequencing means for energizing said first and second circuit means to effect operation of said motor at said second higher speed and operation of said power transmission means to said low-ratio speed reduction whereby said container is accelerated to said relatively high speed; sensing means actuatable responsive to predetermined unbalanced forces within said container during either of said extraction speeds; switch means including in said controlling means and responsive to actuation of said sensing means for operation from a first condition to a second condition to alter the energization of said first and second circuit means and to effect operation of said motor at said first lower speed and operation of said power transmission means to said high-ratio speed reduction whereby said container is rotated at said tumble speed; and time delay means responsive to actuation of said sensing means and operable after a first predetermined time delay following actuation of said sensing means for operating said switch means from said second condition to a third intermediate condition for restoring the energization of said first circuit means to effect operation of said motor at said second higher speed while maintaining said power transmission means in said high-ratio speed reduction whereby said container is rotated at said low extraction speed, said time delay means being further operable after a second succeeding predetermined time delay for operating said switch means for said third condition to said first condition for restoring the energization of said second circuit means to effect operation of said power transmission means to said low-ratio speed reduction whereby said container is accelerated to said relatively high speed.

7. In a laundry apparatus for centrifuging fluid from fabrics as defined in claim 6 wherein said switch means includes a first switch in said first circuit means for switching said motor between said second speed and said first speed and further including a second switch in said second circuit means for actuating said power transmission between said low-ratio speed reduction and said high-ratio speed reduction and controlling energization of said time delay means.

References Cited by the Examiner
UNITED STATES PATENTS

| | | | |
|---|---|---|---|
| 2,911,812 | 11/1959 | Metzger | 210—144 X |
| 2,943,472 | 7/1960 | Painter | 210—144 X |
| 2,950,010 | 8/1960 | Bochan | 210—144 |
| 3,084,799 | 4/1963 | Decatur | 68—24 X |
| 3,172,278 | 3/1965 | Burkland | 68—24 X |
| 3,226,960 | 1/1966 | Mellinger | 210—144 X |

REUBEN FRIEDMAN, *Primary Examiner.*

D. M. RIESS, *Assistant Examiner.*